US005595298A

United States Patent [19]
Straeter

[11] Patent Number: 5,595,298
[45] Date of Patent: Jan. 21, 1997

[54] METHOD AND APPARATUS FOR PROVIDING A WRAPPER FOR A FLORAL GROUPING HAVING A FLAP FOR CLOSING THE UPPER END OR THE LOWER END OF THE WRAPPER

[75] Inventor: William F. Straeter, Breese, Ill.

[73] Assignee: Southpac Trust International, Inc., Oklahoma City, Okla.

[21] Appl. No.: 444,001

[22] Filed: May 18, 1995

Related U.S. Application Data

[62] Division of Ser. No. 193,822, Feb. 9, 1994, which is a continuation of Ser. No. 923,117, Jul. 30, 1992, Pat. No. 5,307,605, which is a continuation-in-part of Ser. No. 803,318, Dec. 4, 1991, Pat. No. 5,344,016, which is a continuation-in-part of Ser. No. 707,417, May 28, 1991, abandoned, which is a continuation of Ser. No. 502,358, Mar. 29, 1990, abandoned, which is a continuation-in-part of Ser. No. 391,463, Aug. 9, 1989, abandoned, which is a continuation-in-part of Ser. No. 249,761, Sep. 26, 1988, abandoned.

[51] Int. Cl.⁶ ....................................................... A01G 5/02
[52] U.S. Cl. .............................................. 206/423; 47/72
[58] Field of Search ........................ 206/423; 229/87.01; 47/72

[56] References Cited

U.S. PATENT DOCUMENTS

| | | | |
|---|---|---|---|
| 557,526 | 3/1896 | Egge. | |
| 732,889 | 7/1903 | Paver. | |
| 1,525,015 | 2/1925 | Weeks. | |
| 1,733,998 | 10/1929 | Rosen | 53/415 |
| 1,863,216 | 6/1932 | Wordingham. | |
| 1,978,631 | 10/1934 | Herrlinger. | |
| 2,048,123 | 7/1936 | Howard | 229/87 |
| 2,170,147 | 8/1939 | Lane | 206/56 |
| 2,278,673 | 4/1942 | Savada et al. | 154/43 |
| 2,371,985 | 2/1943 | Freiberg | 206/46 |
| 2,411,328 | 11/1946 | MacNab | 33/12 |
| 2,510,120 | 6/1950 | Leander | 117/122 |
| 2,529,060 | 11/1950 | Trillich | 117/68.5 |
| 2,544,075 | 3/1951 | Ernst et al. | 150/49 |
| 2,621,142 | 12/1952 | Wetherell | 154/117 |
| 2,822,287 | 2/1958 | Avery | 117/14 |
| 2,846,060 | 8/1958 | Yount | 206/58 |
| 2,883,262 | 4/1959 | Borin | 21/56 |
| 2,994,424 | 8/1961 | Selby et al. | 206/423 |
| 3,022,605 | 2/1962 | Reynolds | 47/58 |
| 3,113,712 | 12/1963 | Kindseth | 229/14 |
| 3,121,647 | 2/1964 | Harris | 118/202 |
| 3,130,113 | 4/1964 | Silman | 161/97 |
| 3,148,799 | 9/1964 | Meroney | 220/63 |

(List continued on next page.)

FOREIGN PATENT DOCUMENTS

| | | |
|---|---|---|
| 2036163 | 12/1970 | France. |
| 2272914 | 12/1975 | France. |
| 2610604 | 8/1988 | France. |

OTHER PUBLICATIONS

Exhibit A—"The Simple Solution For Those Peak Volume Periods", Highland Supply Speed Cover® Brochure, 1989©, 6 pages.
Exhibit B—"A World of Cut Flower and Pot Plant Packaging", Klerk's Plastic Products Manufacturing, Inc. Brochure, date unknown, 6 pages.
Exhibit C—"Speed Sheets® And Speed Rolls", Highland Supply Speed Sheets® Brochure, 1990©, 2 pages.

*Primary Examiner*—Jacob K. Ackun
*Attorney, Agent, or Firm*—Dunlap & Codding, P.C.

[57] ABSTRACT

A wrapper for a floral grouping formed from a sheet of material having a closure bonding material on a portion thereof. The sheet of material is wrapped about the floral grouping with the closure bonding material securing the sheet of material in a wrapped position about the floral grouping to form the wrapper. A top flap is folded over an open upper end of the wrapper and connected to the wrapper to prevent the floral grouping from shifting in the wrapper and extending out from the open upper end of the wrapper. In one form, a bottom flap is connected to the wrapper and extends over an open lower end of the wrapper to prevent the floral grouping from shifting in the wrapper and extending out from the open lower end of the wrapper.

30 Claims, 4 Drawing Sheets

U.S. PATENT DOCUMENTS

| | | | |
|---|---|---|---|
| 3,215,330 | 11/1965 | Thomas | 229/14 |
| 3,271,922 | 9/1966 | Wallerstein et al. | 53/3 |
| 3,508,372 | 4/1970 | Wallerstein et al. | 53/3 |
| 3,514,012 | 5/1970 | Martin | 220/63 |
| 3,556,389 | 12/1967 | Gregoire | 47/72 X |
| 3,620,366 | 11/1971 | Parkinson | 206/59 |
| 3,657,840 | 4/1972 | Benoist | 206/423 X |
| 3,681,105 | 8/1972 | Milutin et al. | 117/15 |
| 3,757,990 | 8/1973 | Buth | 229/63 |
| 3,927,821 | 12/1975 | Dunning | 229/14 |
| 4,054,697 | 10/1977 | Reed et al. | 428/40 |
| 4,216,620 | 8/1980 | Weder et al. | 47/72 |
| 4,333,267 | 6/1982 | Witte | 47/84 |
| 4,379,101 | 4/1983 | Smith | 264/40.3 |
| 4,380,564 | 4/1983 | Cancio et al. | 428/167 |
| 4,413,725 | 11/1983 | Bruno et al. | 206/45.33 |
| 4,546,875 | 10/1985 | Zweber | 206/0.82 |
| 4,621,733 | 11/1986 | Harris | 47/72 X |
| 4,733,521 | 3/1988 | Weder et al. | 53/580 |
| 4,765,464 | 8/1988 | Ristvedt | 206/0.82 |
| 5,235,782 | 8/1993 | Landau | 47/72 |

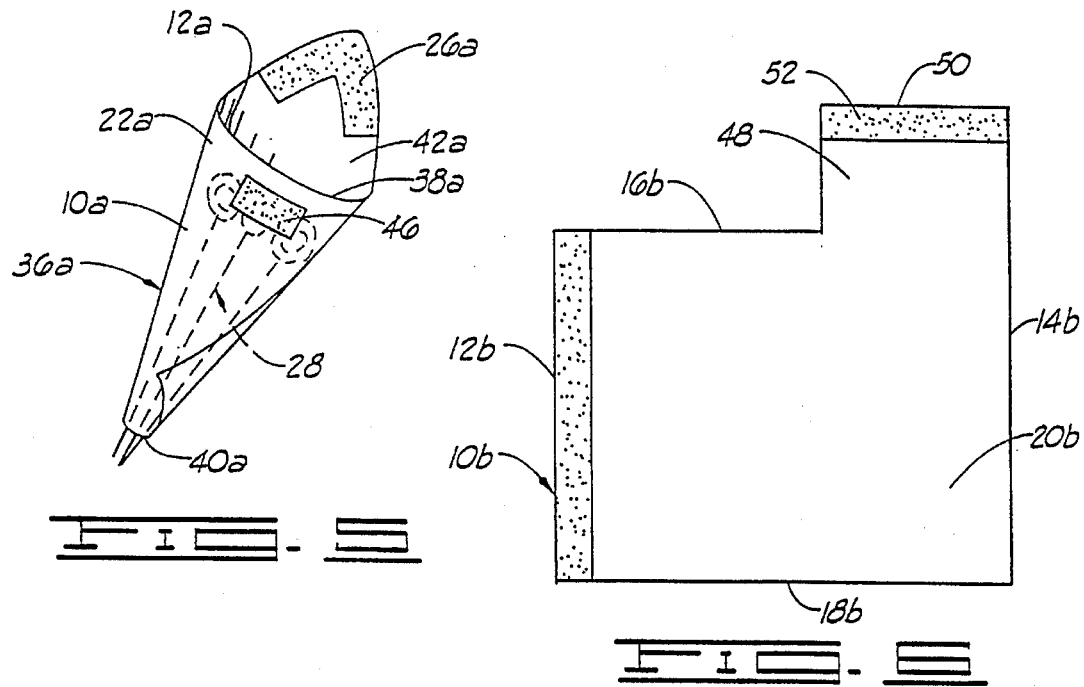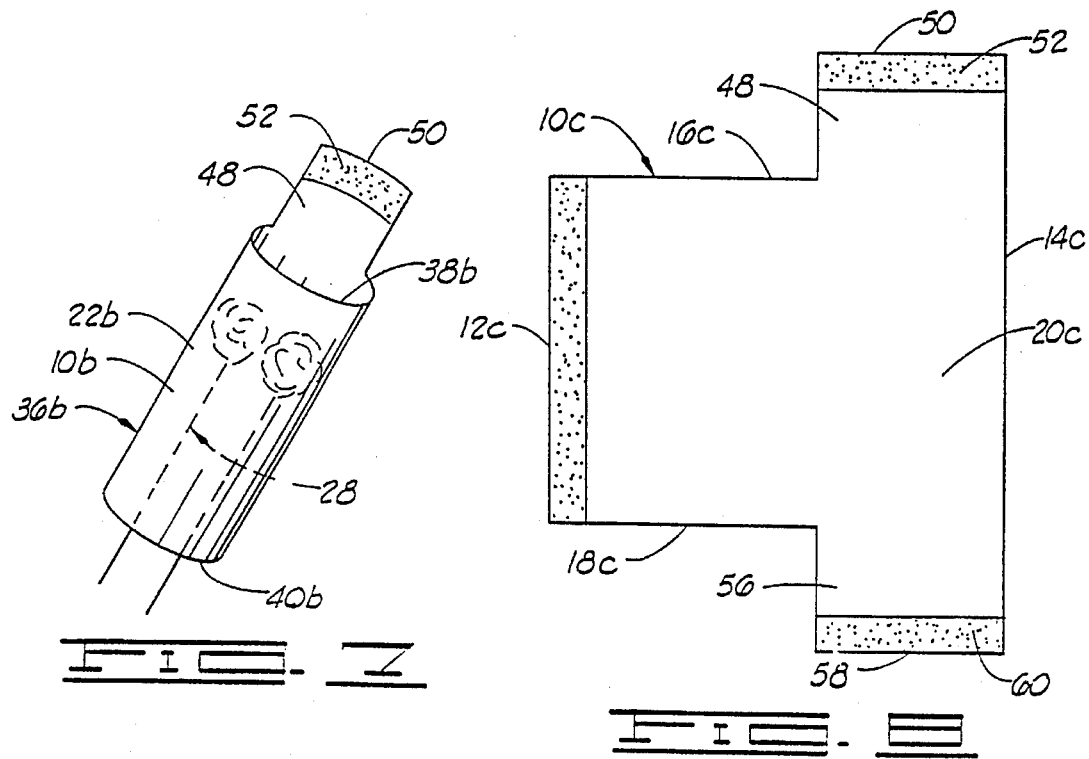

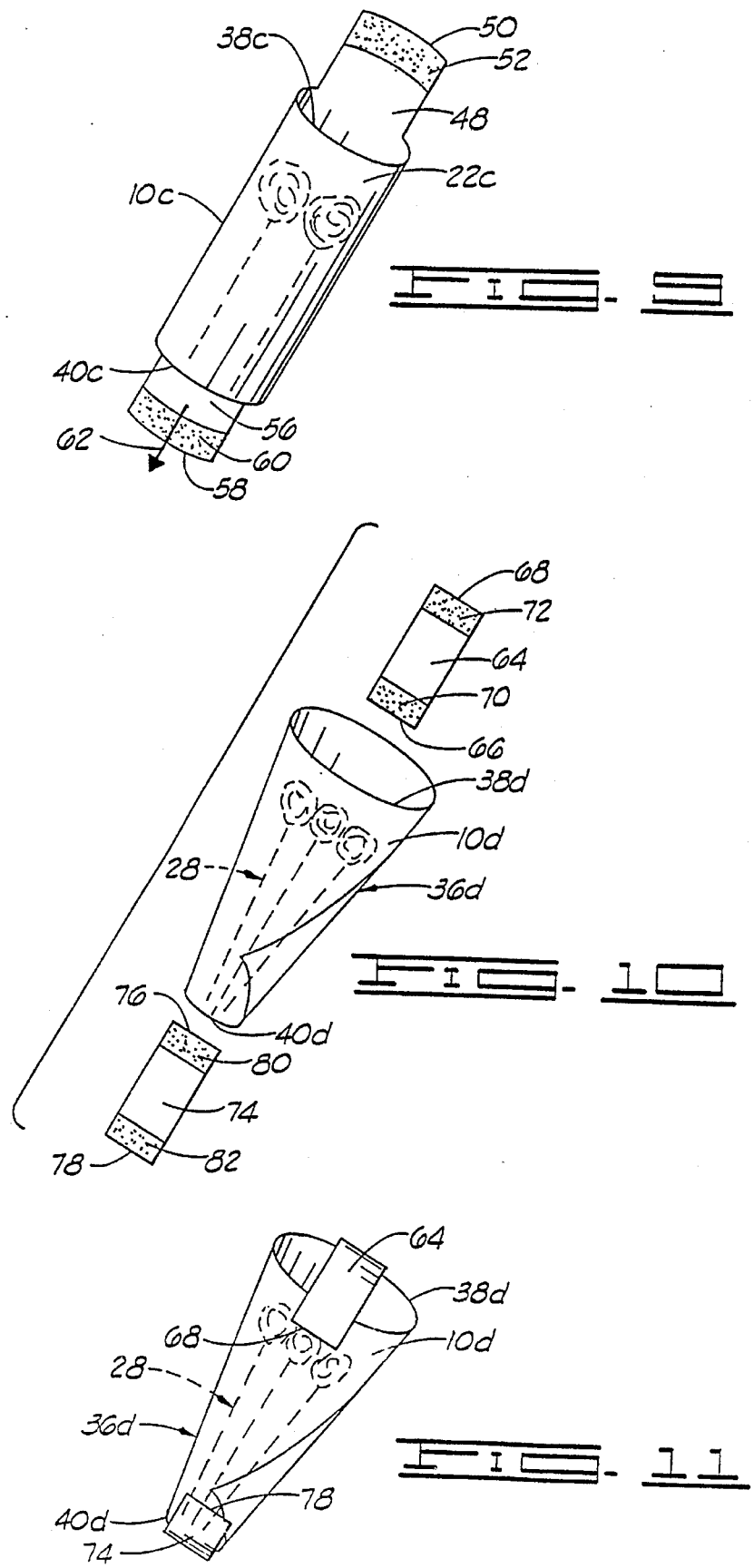

5,595,298

METHOD AND APPARATUS FOR PROVIDING A WRAPPER FOR A FLORAL GROUPING HAVING A FLAP FOR CLOSING THE UPPER END OR THE LOWER END OF THE WRAPPER

CROSS REFERENCE TO RELATED APPLICATIONS

This Application is a divisional of co-pending U.S. Ser. No. 08/193,822, filed Feb. 9, 1994, entitled "METHOD FOR PROVIDING A WRAPPER FOR A FLORAL GROUPING HAVING A FLAP FOR CLOSING THE UPPER END OR THE LOWER END OF THE WRAPPER (AS AMENDED)", which is a continuation of U.S. Ser. No. 07/923,117, filed Jul. 30, 1992, now U.S. Pat. No. 5,307,605, issued May 3, 1994, entitled "METHOD AND APPARATUS FOR PROVIDING A WRAPPER FOR A FLORAL GROUPING HAVING A FLAP FOR CLOSING THE UPPER END OR THE LOWER END OF THE WRAPPER", which is a continuation-in-part of U.S. Ser. No. 07/803,318, filed Dec. 4, 1991, now U.S. Pat. No. 5,344,016, issued Sep. 6, 1994, entitled "WRAPPING MATERIAL FOR WRAPPING A FLORAL GROUPING HAVING STAGGERED STRIPS OF ADHESIVE APPLIED THERETO AND METHOD", which is a continuation-in-part of U.S. Ser. No. 07/707,417, filed May 28, 1991, now abandoned, entitled "WRAPPING A FLORAL GROUPING WITH SHEETS HAVING ADHESIVE OR COHESIVE MATERIAL APPLIED THERETO", which is a continuation of U.S. Ser. No. 07/502,358, filed Mar. 29, 1990, now abandoned, entitled "WRAPPING A FLORAL GROUPING WIDTH SHEETS HAVING ADHESIVE OR COHESIVE MATERIAL APPLIED THERETO", which is a continuation-in-part of U.S. Ser. No. 07/391,463, filed Aug. 9, 1989, now abandoned, entitled "ADHESIVE APPLICATOR DISPENSER", which is a continuation-in-part of U.S. Ser. No. 249,761, filed Sep. 26, 1988, now abandoned, entitled "METHOD FOR WRAPPING AN OBJECT IN A MATERIAL HAVING PRESSURE SENSITIVE ADHESIVE THEREON".

FIELD OF THE INVENTION

The present invention relates generally to a method for wrapping a floral grouping and more particularly, but not by way of limitation, to a sheet of material for wrapping a floral grouping forming a wrapper with an open upper end and a top flap connected to the wrapper and extending over the open upper end of the wrapper to secure the top flap in a position extending over the open upper end of the wrapper to substantially prevent the floral grouping from shifting in the wrapper and extending out from the open upper end of the wrapper.

BRIEF DESCRIPTION OF THE DRAWINGS

FIG. 5 is a perspective view of a modified wrapper.

FIG. 6 is a top plan view of a modified sheet of material with the top flap formed on the sheet of material.

FIG. 7 is a perspective view of the sheet of material of FIG. 6 wrapped about a floral grouping to form a wrapper and showing the top flap prior to the top flap being folded over the open upper end of the wrapper.

FIG. 8 is a top plan view of yet another modified sheet of material, similar to FIG. 7, but showing a bottom flap also being formed on the sheet of material.

FIG. 9 is a perspective view showing the sheet of material of FIG. 8 wrapped about the floral grouping to form a wrapper with the wrapper being shown prior to the top flap being folded over the open upper end of the wrapper and prior to the bottom flap being folded over the open lower end of the wrapper.

FIG. 10 is a perspective view of a sheet of material, identical to the sheet of material shown in FIG. 1 but with no flap bonding material disposed thereon and showing the sheet of material wrapped about the floral grouping to form a wrapper and showing a top flap and a bottom flap prior to the top and the bottom flaps being connected to the wrapper.

FIG. 11 is a perspective view of the wrapper of FIG. 1 showing the top and the bottom flaps folded over the respective open upper end and open lower end of the wrapper and connected to the wrapper.

DESCRIPTION OF THE PREFERRED EMBODIMENTS

Figure 1:
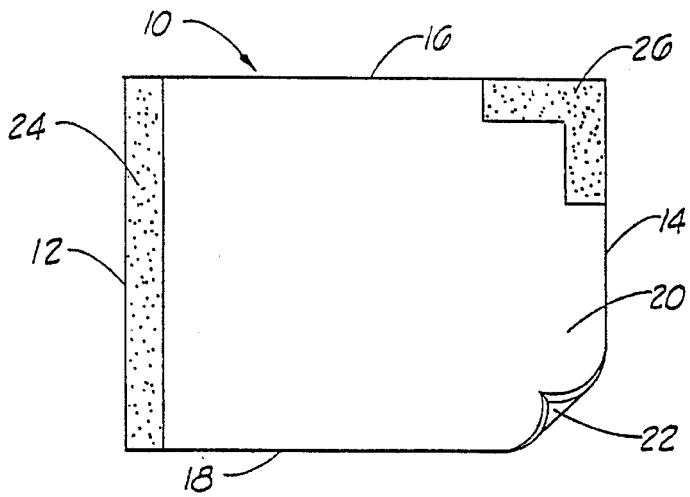
FIG. 1 is a plan view of a sheet of material constructed in accordance with the present invention showing one end Portion of the sheet of material folded over to expose the lower surface of the sheet of material.

Shown in FIG. 1 and designated by the general reference numeral 10 is a sheet of material constructed in accordance with the present invention. The sheet of material 10 may be constructed of any material selected from a group of materials consisting of man-made organic polymer film, metal foil, fiber (woven or unwoven or natural or synthetic), denim, cellophane or burlap or combinations thereof.

The sheet of material 10 has a first end 12, a second end 14, a first side 16, a second side 18, an upper surface 20 and a lower surface 22.

A closure bonding material 24 is disposed on the upper surface 20 of the sheet of material 10. The closure bonding material 24 is disposed near the first end 12 of the sheet of material 10 and extends generally between the first and the second sides 16 and 18 of the sheet of material 10. The closure bonding material may be an adhesive type of material or a cohesive type of material. Where a cohesive type of material is utilized, a cooperating cohesive type of material also must be positioned on the lower surface 22 of the sheet of material 10 for connecting to the cohesive closure bonding material 24 disposed on the upper surface 20 when the sheet of material is wrapped to form the wrapper, as will be described in greater detail below.

A flap bonding material 26 is disposed on the upper surface 20 of the sheet of material 10. The flap bonding material 26 more particularly is disposed near the first side 16 of the sheet of material 10 and near the second end 14 of the sheet of material 10. Preferably, a portion of the flap bonding material 26 extends a distance along with the first side 16 and a distance along the second end 14 of the sheet of material 10 for reasons which will be made more apparent. The flap bonding material 26 may be any of the materials described before with respect to the closure bonding material.

The term "man-made organic polymer film" means a man-made resin such as a polypropylene as opposed to naturally occurring resins such as cellophane.

A man-made organic polymer film is relatively strong and not as subject to tearing (substantially non-tearable), as might be the case with paper or foil. The man-made organic polymer film is a substantially linearly linked processed organic polymer film and is a synthetic linear chain organic polymer where the carbon atoms are substantially linearly linked. Such films are synthetic polymers formed or synthesized from monomers. Further, a relatively substantially linearly linked processed organic polymer film is virtually waterproof Which may be desirable in many applications such as wrapping a floral grouping.

The sheet of material 10 preferably has a thickness in a range from about 0.2 mils to about 30 mils. More particularly, the sheet of material 10 has a thickness in a range from about 0.2 mils to about 10 mils.

In operation, a floral grouping 28 having a stem end 30 and a bloom end 32 is disposed on a portion of the upper surface 20 of the sheet of material. The floral grouping 28 is positioned on the upper surface 20 of the sheet of material 10 with the stem end 30 extending a distance beyond the second side 18 of the sheet of material 10 and with the bloom end 32 being spaced a distance from the first side 16 of the sheet of material 10 and a distance from the first and the second ends 12 and 14 of the sheet of material 10.

Figure 2:
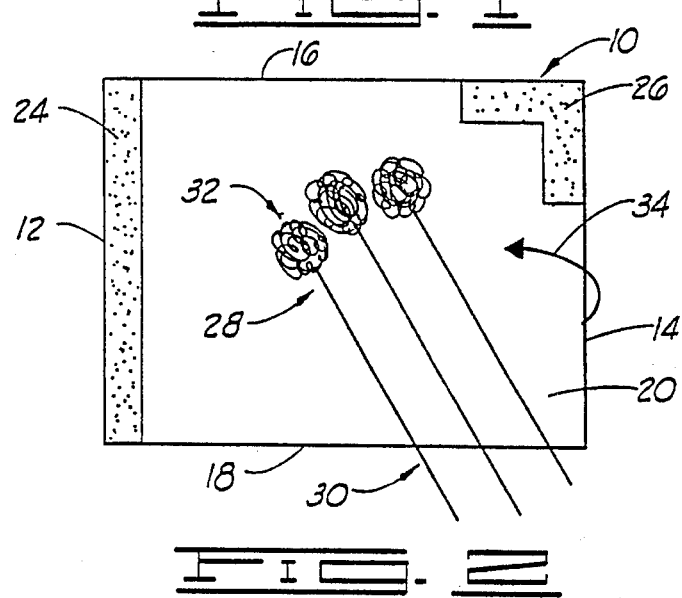
FIG. 2 is a top plan view of the sheet of material of FIG. 1 showing a floral grouping disposed on the upper surface of the sheet of material prior to wrapping the sheet of material about the floral grouping to form a wrapper.

The sheet of material 10 is wrapped about the floral grouping by taking a portion of the sheet of material near the second end 14 and folding the sheet of material over the floral grouping 28 as indicated in FIG. 2 by the directional arrow 34. The sheet of material 10 is wrapped about the floral grouping 28 in at least one wrap around or a series of wrap arounds until the closure bonding material 24 is disposed adjacent a portion of the lower surface 22 of the sheet of material 10. In this position, the closure bonding material 24 bondingly engages and bondingly contacts the adjacent portion of the lower surface 22 of the sheet of material 10 to secure the sheet of material 10 in a wrapped position about the floral grouping 28 (FIG. 3) to provide a wrapper 36 with an open upper end 38 and an open lower end 40.

Figures 3, 4:
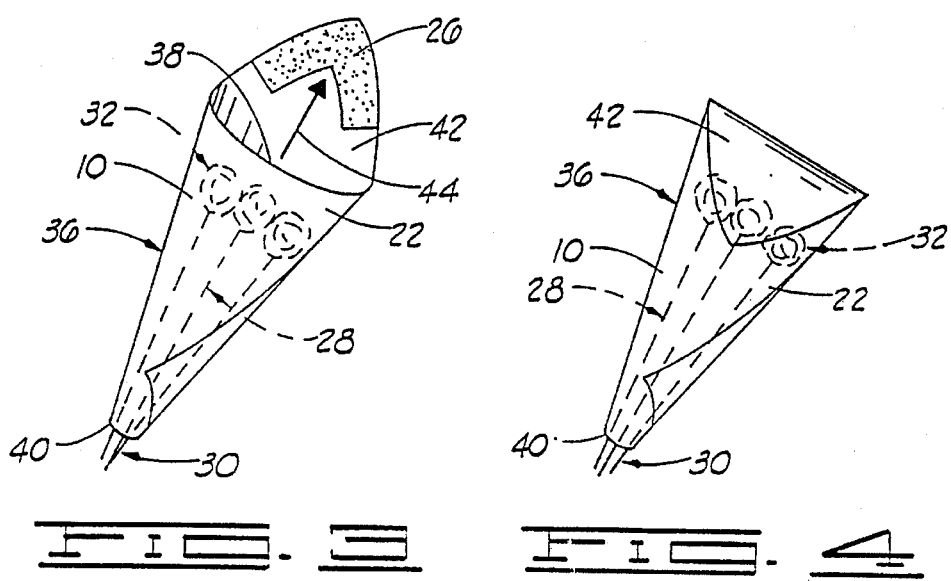
FIG. 3 is a perspective view of a wrapper formed by wrapping the sheet of material of FIG. 2 about the floral grouping and showing the wrapper prior to the top flap being closed over the open upper end of the wrapper.
FIG. 4 is a perspective view of the wrapper of FIG. 3 but showing the top flap folded over the open upper end of the wrapper.

When the sheet of material is wrapped about the floral grouping 28, as shown in FIG. 3, the bloom end 32 of the floral grouping 28 Is surrounded by the wrapper 36 yet visible through the open upper end 38 of the wrapper 36. The bloom end 32 is disposed below the open upper end 38 of the wrapper 36. In this position, a portion of the sheet of material 10 near the first side 16 and near the second end 14 of the sheet of material 10 extends a distance above the open upper end 38 of the wrapper 36 to form a top flap 42 (FIG. 3) with the flap bonding material 26 being disposed on the top flap 42. In this position, the top flap 42 is folded over the open upper end 38 of the wrapper 36 to a position wherein the top flap 42 extends over the open upper end 38 of the wrapper 36 and a portion of the top flap 42 is disposed adjacent a portion of the sheet of material 10 forming the wrapper 36 so that the flap bonding material 26 bondingly engages the adjacent portion of the sheet of material 10 and bondingly connects the top flap 42 to the sheet of material 10 thereby securing the top flap 42 in a position extending over the open upper end 38 of the wrapper 36 for substantially preventing the floral grouping 28 from shifting in the wrapper 36 and moving in a direction 44 (FIG. 3) and extending out from the open upper end 38 of the wrapper 36. The top flap 42 thereby cooperates to maintain the floral grouping 28 in the wrapper 36 which is particularly useful when floral groupings 28 wrapped with the wrapper 36 are placed in a shipping carton (not shown) for shipment, the top flap 42 preventing the movement of the floral groupings 28 out of the open upper end 38 of the wrapper 36 during the shipment of the floral groupings 28 in the wrapper 36.

The sheet of material 10 preferably is tightly wrapped about the stem end 30 of the floral grouping 28 and loosely wrapped about the bloom end 32 of the floral grouping 28 whereby the bloom end 32 is visible via the opened upper end 38 of the wrapper 36 with the wrapper 36 forming a conically shaped wrapper 36. The sheet of material 10 also may be wrapped about the floral grouping 28 to form a cylindrically shaped wrapper 36 (see FIG. 7 for example) if desired in a particular application.

"Floral grouping" as used herein means cut fresh flowers, artificial flowers, a single flower, other fresh and/or artificial plants or other floral materials and may include other secondary plants and/or ornamentation which add to the aesthetics of the overall floral grouping.

Embodiment of FIG. 5

Shown in FIG. 5 is a modified sheet of material 10a which is constructed exactly like the sheet of material 10 shown in FIGS. 1, 2 and 3 and described in detail before, except the flap bonding material 26a more particularly in FIG. 5 is a cohesive material and another cohesive bonding material 46 is disposed on a portion of the lower surface 22a of the sheet of material 10a near the first end 12a thereof so that, when the sheet of material 10a is wrapped about the floral grouping 28, the cohesive bonding material 46 is disposed on the outer surface of the wrapper 36.

When the top flap 42a is folded over the open upper end 38a of the wrapper 36a, the cohesive bonding material 46 is brought into contact with the cohesive flap bonding material 26a for cohesively bonding and connecting the adjacent portions of the top flap 42a and the sheet of material 10a for securing the top flap 42a in a connected position extending over the open upper end 38a of the wrapper. 36a for the reasons described before in connection with the wrapper 36 shown in FIG. 3.

Embodiments of FIGS. 6 and 7

Shown in FIG. 6 is a modified sheet of material 10b which is constructed exactly like the sheet of material 10 shown in FIG. 1 and described in detail before, except the sheet of material 10b has a top flap 48 formed on a portion thereof. The top flap 48 is connected to the first side 16b of the sheet of material 10b and the top flap 48 extends a distance outwardly from the first side 16b of the sheet of material 10b terminating with an end 50. A flap bonding material 52 (FIG. 7) is disposed on a portion of the top flap 48 near the end 50.

In this embodiment, the floral grouping 28 is disposed on a portion of the upper surface 20b of the sheet of material 10b in a manner exactly like that described before in connection with FIG. 2, except the floral grouping 28 does not extend angularly over the upper surface 20b of the sheet of material 10b, rather, the floral grouping 28 extends about perpendicularly between the first and the second side 16*b* and 18*b* of the sheet of material 10*b*.

The sheet of material 10*b* is wrapped about the floral grouping 28 in a manner like that described before in connection with the sheet of material 10 shown in FIG. 2 to form the wrapper 36*b* (FIG. 7), except the sheet of material 10*b* is wrapped about the floral grouping 28 to form a cylindrically shaped wrapper 36*b* as shown in FIG. 7.

It should be noted that the sheet of material 10*b* could be wrapped about the floral grouping 28 in a conical shape like that shown in FIG. 4 if desired. When the sheet of material 10*b* is wrapped about the floral grouping 28 to form the wrapper 36*b* (FIG. 7), the top flap 48 extends a distance above the open upper end 38*b* of the wrapper 36*b*, as shown in FIG. 7. In this position, the top flap 48 is folded over the open upper end 38*b* of the wrapper 36*b* and the flap bonding material 52 is brought into contact with an adjacent portion of the sheet of material 10*b* for bondingly engaging and bondingly connecting the end 50 of the top flap 48 to the adjacent portions of the sheet of material 10*b*. In this position, the top flap 48 extends over the open upper end 38*b* of the wrapper 36*b* to substantially prevent movement of the floral grouping 28 and to substantially prevent the floral grouping 28 from shifting in the wrapper 10*b* and extending out from the open upper end 38*b* of the wrapper 36*b* in a manner and for reasons like that described before in connection with FIGS. 3 and 4.

Embodiments of FIGS. 8 and 9

As shown in FIG. 8 is another modified sheet of material 10*c* which is constructed exactly like the sheet of material 10*b* shown in FIG. 6 and described in detail before, except the sheet of material 10*c* also includes a bottom flap 56. The bottom flap 56 is formed on or connected to the second side 18*c* of the sheet of material 10*c*. The bottom flap 56 extends a distance outwardly from the second side 18*c* of the sheet of material 10*c* terminating with an end 58. A flap bonding material 60 is disposed on the bottom flap 56 with the flap bonding material 60 being disposed near the end 58 of the bottom flap 56.

The sheet of material 10*c* is wrapped about the floral grouping 28 to form a wrapper 36*c* (FIG. 9) in a manner exactly like that described before in connection with FIG. 7. In the wrapped condition of the sheet of material 10*c* wrapped about the floral grouping 28, the top flap 48 extends a distance above the open upper end 38*c* of the wrapper 36*c* and the bottom flap 56 extends a distance below the open lower end 40*c* of the wrapper 36*c*. In this position, the top flap 42*c* is disposed over the open upper end 38*c* and connected to the sheet of material 10*c* in a manner like that described before in connection with FIG. 7. The bottom flap 56 is folded over the open lower end 40*c* of the wrapper 36*c* to a position wherein a portion of the bottom flap 56 near the end 58 thereof is brought into contact with an adjacent portion of the sheet of material 10*c* and, in this position, the flap bonding material 60 on the bottom flap 56 is brought into bonding contact and bondingly connects the bottom flap 56 to the sheet of material 10*c*. In this position, the bottom flap 56 extends over the open lower end 40*c* of the wrapper 36*c* to substantially prevent movement of the floral grouping 28 in a direction 62 (FIG. 9) out from the open lower end 40*c* of the wrapper 36*c* thereby substantially preventing the floral grouping 28 from shifting in the wrapper 36*c* and extending out from the open lower end 40*c* of the wrapper 36*c*.

Embodiments of FIGS. 10 and 11

Shown in FIGS. 10 and 11 is a sheet of material 10*d* which is constructed exactly like the sheet of material 10 shown in FIG. 1 and described in detail before, except the sheet of material 10*d* does not include flap bonding material like the flap bonding material 26 on the sheet of material 10 shown in FIG. 1. The sheet of material 10*d* is wrapped about the floral grouping 28 in a manner like that described before in connection FIG. 3 or FIG. 7 to form the wrapper 36*d* extending about the floral grouping 28 with the open upper end 38*d* and the open lower end 40*d*.

In this embodiment, a top flap 64 is provided having a first end 66 and a second end 68. The top flap 64 preferably is formed from a material exactly like the material utilized to form the sheet of material 10. A flap bonding material 70 is disposed on the top flap 64 near the first end 66 thereof. A flap bonding material 72 is disposed on the top flap 64 near the second end 68 thereof.

In the embodiment shown in FIGS. 10 and 11, a bottom flap 74 also is included. The bottom flap 74 has a first end 76 and a second end 78. A flap bonding material 80 is disposed on the bottom flap 74 near the first end 76 thereof. A flap bonding material 82 is disposed on the bottom flap 74 near the second end 78 thereof. The bottom flap 74 is constructed of a material exactly like the material utilized to construct the sheet of material 10 described in detail before.

In operation, the sheet of material 10*d* is wrapped about the floral grouping 28 to provide the wrapper 36*d* in a manner exactly like that described before in connection with FIG. 3 or FIG. 7 or FIG. 9 to form a cylindrically shaped or conically shaped wrapper 36*d*. After the wrapper 36*d* has been formed, the first end 66 of the top flap 64 is placed adjacent a portion of the wrapper 36*d* and bondingly connected thereto by way of the flap bonding material 70. The top flap 64 then is extended over the open upper end 38*d* of the wrapper 36*d* to a position wherein the second end 68 of the top flap 64 is disposed adjacent another portion of the sheet of material 10*d*. In this position, the flap bonding material 72 near the second end 68 of the top flap 64 bondingly engages and bondingly connects the second end 68 of the top flap 74 to a portion of the wrapper 36*d* thereby securing the top flap 64 in a position extending over the open upper end 38*d* of the wrapper 36*d* for reasons described before.

The first end 76 of the bottom flap 74 is then positioned adjacent a portion of the wrapper 36*d* near the open upper end 38*d* of the wrapper 36*d*. In this position, the flap bonding material 80 on the bottom flap 74 is brought into bonding contact with a portion of the sheet of material 10*d* for bondingly engaging and bondingly connecting the first end 76 of the bottom flap 74 to the wrapper 36*d*. The bottom flap 74 then is extended over the open lower end 40*d* of the wrapper 36*d* and a portion of the second end 78 of the bottom flap 74 is positioned adjacent a portion of the wrapper 10*d* near the open lower end 40*d* thereof. In this position, the bottom flap 74 extends over the open lower end 40*d* of the wrapper 36*d* to substantially prevent movement of the floral grouping 28 and to substantially prevent shifting of the floral grouping 28 in the wrapper 36*d* in a direction outwardly from the open lower end 40*d* of the wrapper 36*d**

As described before, the bonding material may be a cohesive or an adhesive. In one other embodiment, the flap bonding material 26 or 52 or 60 or 70 and 72 or 80 and 82 may comprise the sheet of material where the sheet of material is heat sealable and, in this instance, these flap bonding materials would not be a cohesive or an adhesive actually added on the sheet of material. Rather, the top flap or the bottom flap would be disposed adjacent a portion of the sheet of material and heat would be applied to the top flap and the bottom flap to heat seal the ends of the top flap and the bottom flap to the wrapper for connecting the top flap and the bottom flap to the wrapper. Also, the closure bonding material 24 may be formed by using a heat sealable sheet of material and, in this instance, the closure bonding material 24 would not be a separate bonding material actually disposed on the sheet of material. Rather, the sheet of material would be wrapped about the floral grouping and heat would be applied to a portion of the sheet of material for securing the adjacent portions of the sheet of material together to secure the sheet of material in a wrapped condition about the floral grouping to form the wrapper. The term "bonding material" as used herein is intended to encompass an adhesive or a cohesive or a sheet of material constructed of a heat sealing material or a heat sealing lacquer where heat is applied to effect the bonding.

In those instances where the sheet of material is not per se heat sealable, a heat sealing lacquer can be applied. In this instance, the closure bonding material and the flap bonding material described herein would comprise a heat sealing lacquer and heat would be applied to secure the sheet of material in a wrapped condition forming the wrapper and to secure the top flap and/or the bottom flap to the wrapper.

Figure 12:
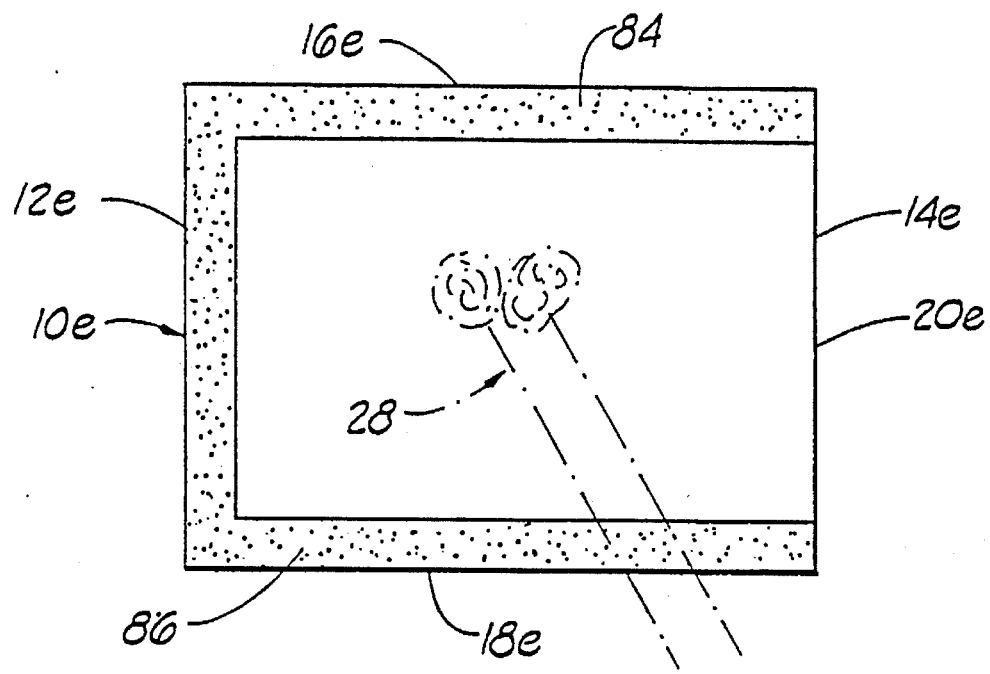
Figure 13:
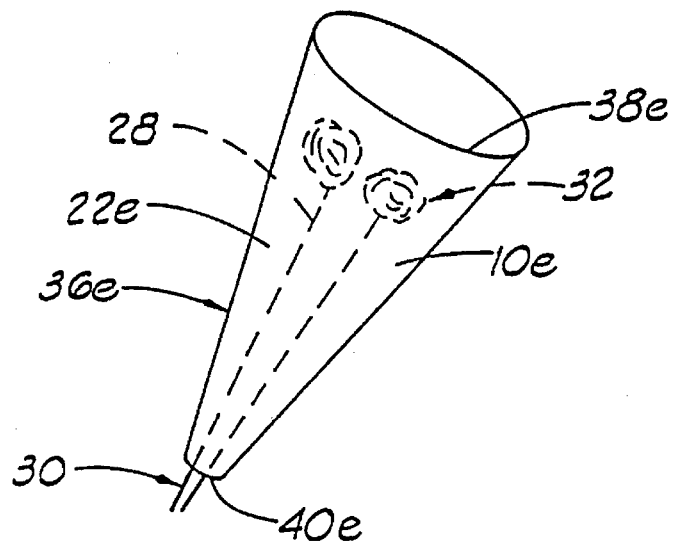

Embodiments of FIGS. 12 and 13

Shown in FIG. 12 is another modified sheet of material 10e which is constructed exactly like the sheet of material 10 shown in FIG. 1 and described in detail before, except the sheet of material 10e includes a flap bonding material 84 disposed near the first side 16e and extending between the first and the second ends 12e and 14e of the sheet of material 10e and the sheet of material 10e also includes a flap bonding material 86 disposed near the second side 18e of the sheet of material 10e and extending between the first and the second ends 12e and 14e of the sheet of material 10e. The sheet of material 10e does not include the flap bonding material 26 shown in FIG. 1 on the sheet of material 10.

The sheet of material 10e is wrapped about the floral grouping 28 to form the wrapper 36e shown in FIG. 13 in a manner exactly like that described before with respect to the forming of the wrapper 36 in FIG. 3, except it is not necessary to position the floral grouping 28 or to wrap the floral grouping 28 so that a top flap like the top flap 42 is formed when the sheet of material 10e is wrapped about the floral grouping 28 to form the wrapper 36e. The wrapper 36e when initially formed about the floral grouping 28 includes the open upper end 38e and the open lower end 40e. The wrapper 36e may be conically shaped or cylindrically shaped depending upon what is desired in a particular application.

After the wrapper 36e has been formed about the floral grouping 28, the open upper end 38e of the wrapper 36e is closed by pressing the opposite sides of the open upper end 36e together bring the flap bonding material 84 into engagement with either adjacent flap bonding material 84 or adjacent portions of the sheet of material near the open upper end 38e for closing the open upper end 38e. In a similar manner, the open lower end 40e of the wrapper 36e is closed by bringing portions of the flap bonding material 86 into engagement with adjacent portions of the flap bonding material 86 or adjacent portions of the sheet of material 10e for bondingly connecting portions of the sheet of material 10e and closing the open lower end 40e of the wrapper 36e.

Changes may be made in the construction of the various components, elements and assemblies described herein and changes may be made in the steps or the sequence of steps of the methods described herein without departing from the spirit and scope of the invention as defined in the following claims.

What is claimed is:

1. A plant package comprising:
   a sheet of material having an upper surface and a lower surface and having a closure bonding material disposed on a portion of the sheet of material and having a flap bonding material disposed upon another portion thereof; and
   a floral grouping having a stem end and a bloom end, the floral grouping wrapped by the sheet of material and with the portion of the sheet of material having the closure bonding material disposed thereon forming a connection with an adjacent portion of the sheet of material for cooperating to secure the sheet of material about the floral grouping to provide a wrapper having an upper end and a lower end and wherein said connection may be adjustably positioned when the sheet is wrapped about the floral grouping and with a portion of the sheet of material being folded over the lower end of the wrapper and being connected thereto by the flap bonding material for forming a flap extending over the lower end of the wrapper.

2. The plant package of claim 1 wherein the sheet of material is defined further as being constructed of a material selected from a group of materials consisting of a man-made organic polymer film, metal foil, fiber (woven or unwoven, natural or synthetic) denim, cellophane or burlap or combinations thereof.

3. The plant package of claim 1 wherein the sheet of material is defined further as having a thickness in a range from about 0.2 mils to about 30 mils.

4. The plant package of claim 1 wherein the sheet of material is defined further as having a thickness in a range from about 0.2 mils to about 10 mils.

5. The plant package of claim 1 wherein the sheet of material is defined further as having a first end, a second end, a first side and a second side, the closure bonding material being disposed at least near the first end and extending generally between the first and the second sides of the sheet of material.

6. The plant package of claim 5 wherein the sheet of material is defined further as having the flap bonding material disposed at least near the first side and at least near the second end of the sheet of material.

7. The plant package of claim 1 wherein the sheet of material is defined further as having the closure bonding material and the flap bonding material on the upper surface of the sheet of material.

8. The plant package of claim 1 wherein the sheet of material is defined further as being wrapped tightly about the stem end of the floral grouping.

9. The plant package of claim 8 wherein the sheet of material is defined further as being wrapped tightly about the stem end with a portion of the stem end of the floral grouping extending through the lower end of the wrapper.

10. The plant package of claim 1 wherein the wrapper is defined further as substantially encompassing the bloom end of the floral grouping with the bloom end of the floral grouping being visible through the upper end of the wrapper prior to the flap being folded over the upper end of the wrapper.

11. The plant package of claim 1 wherein the wrapper is defined further as being about conically shaped.

12. The plant package of claim 1 wherein the wrapper is defined further as being about cylindrically shaped.

13. A plant package comprising:
   a sheet of material having an upper surface and a lower surface and having a closure bonding material disposed on a portion of the sheet of material;
   a flap comprising a separate piece of material and having a first end and a second end; and
   a floral grouping having a stem end and a bloom end, the sheet of material being wrapped about the floral grouping with the portion of the sheet of material having the closure bonding material disposed thereon forming a connection with an adjacent portion of the sheet of material for cooperating to secure the sheet of material about the floral grouping to provide a wrapper with an upper end and a lower end, and wherein said connection may be adjustably positioned when the sheet is wrapped about the floral grouping and with the first end of the flap being connected to a portion of the wrapper near the lower end thereof and the flap being folded over the lower end of the wrapper and the second end of the flap being connected to another portion of the wrapper near the lower end thereof whereby the flap extends over the lower end of the wrapper.

14. The plant package of claim 13 wherein the sheet of material is defined further as being constructed of a material selected from a group of materials consisting of a man-made organic polymer film, metal foil, fiber (woven or unwoven, natural or synthetic) denim, cellophane or burlap or combinations thereof.

15. The plant package of claim 13 wherein the sheet of material is defined further as having a thickness in a range from about 0.2 mils to about 30 mils.

16. The plant package of claim 13 wherein the sheet of material is defined further as having a thickness in a range from about 0.2 mils to about 10 mils.

17. The plant package of claim 13 wherein the sheet of material is defined further as having a first end, a second end, a first side and a second side, and wherein the closure bonding material is defined further as being disposed at least near the first end and extendingly generally between the first and the second sides of the sheet of material.

18. The plant package of claim 17 wherein the sheet of material is defined further as having the flap bonding material being disposed at least near the first side and at least near the second end of the sheet of material.

19. The plant package of claim 13 wherein the sheet of material is defined further as having the closure bonding material and the flap bonding material disposed on the upper surface of the sheet of material.

20. The plant package of claim 13 wherein the wrapper is defined as being wrapped tightly about the stem end of the floral grouping.

21. The plant package of claim 20 wherein the wrapper is defined further as being tightly wrapped about the stem end with a portion of the stem end of the floral grouping extending through the lower end of the wrapper.

22. The plant package of claim 13 wherein the wrapper is defined further as encompassing the bloom end of the floral grouping with the bloom end of the floral grouping being visible through the upper end of the wrapper prior to the flap being folded over the upper end of the wrapper.

23. The plant package of claim 13 wherein the wrapper is defined further as being about conically shaped.

24. The plant package of claim 13 wherein the wrapper is defined further as being about cylindrically shaped.

25. A method for wrapping a floral grouping comprising:
   providing a sheet of material having an upper surface and a lower surface with a closure bonding material on at least one of the upper and the lower surfaces thereof and with a flap bonding material disposed on a portion of at least one of the upper and the lower surfaces thereof;
   providing a floral grouping having a stem end and a bloom end;
   disposing the floral grouping on the upper surface of the sheet of material;
   wrapping the sheet of material about the floral grouping and disposing the closure bonding material adjacent a portion of the sheet of material whereby the closure bonding material bondingly engages and bondingly connects to an adjacent portion of the sheet of material for cooperating to secure the sheet of material in an wrap position about the floral grouping forming the wrapper for the floral grouping with an open upper end and an open lower end, the flap bonding material on the sheet of material being disposed near the open upper end of the wrapper and the portions of the sheet of material near the open upper end of the wrapper being brought into adjacent contact whereby the flap bonding material bondingly engages either other portions of the flap bonding material or adjacent portions of the sheet of material near the open upper end thereof for connecting the adjacent portions of the sheet of material and substantially closing the open upper end of the wrapper.

26. A plant package, comprising:
   a sheet of material having an upper surface and a lower surface and having a closure bonding material disposed on a portion of the sheet of material and having a flap bonding material disposed upon another portion thereof; and
   a floral grouping having a stem end and a bloom end, the floral grouping wrapped by the sheet of material and with the portion of the sheet of material having the closure bonding material disposed thereon forming a connection with an adjacent portion of the sheet of material for cooperating to secure the sheet of material about the floral grouping to provide a wrapper having an upper end and a lower end and wherein said connection may be formed after one or more wraps of the sheet of material about the floral grouping and with a portion of the sheet of material being folded over the lower end of the wrapper and being connected thereto by the flap bonding material for forming a flap extending over the lower end of the wrapper.

27. A plant package, comprising:
   a sheet of material having an upper surface and a lower surface and having a closure bonding material disposed on a portion of the sheet of material;
   a flap comprising a separate piece of material and having a first end and a second end; and
   a floral grouping having a stem end and a bloom end, the sheet of material being wrapped about the floral grouping with the portion of the sheet of material having the closure bonding material disposed thereon forming a connection with an adjacent portion of the sheet of material for cooperating to secure the sheet of material about the floral grouping to provide a wrapper with an upper end and a lower end and wherein said connection may be formed after one or more wraps of the sheet of material about the floral grouping and with the first end of the flap being connected to a portion of the wrapper near the lower end thereof and the flap being folded over the lower end of the wrapper and the second end of the flap being connected to another portion of the wrapper near the lower end thereof whereby the flap extends over the lower end of the wrapper.

28. A plant package, comprising:

a sheet of material having an upper surface, a lower surface, a first edge and a second edge, the second edge opposite the first edge, and with a closure bonding material disposed on a portion of the sheet of material, the closure bonding material disposed adjacent only one of the first and second edges thereof and with a flap bonding material disposed on a portion of at least one of the upper and the lower surfaces thereof; and a floral grouping having a stem end and a bloom end, the floral grouping wrapped by the sheet of material and with the portion of the sheet of material having the closure bonding material disposed thereon bondingly connected to an adjacent portion of the sheet of material for cooperating to secure the sheet of material about the floral grouping to provide a wrapper having an upper end and a lower end and with a portion of the sheet of material being folded over the lower end of the wrapper and being connected thereto by the flap bonding material for forming a flap extending over the lower end of the wrapper.

29. A plant package, comprising:

a sheet of material having an upper surface, a lower surface, a first edge and a second edge, the second edge opposite the first edge, and with a closure bonding material disposed on a portion of the sheet of material with the closure bonding material disposed adjacent only one of the first and second edges thereof;

a flap having a first end and a second end; and a floral grouping having a stem end and a bloom end, and the floral grouping wrapped by the sheet of material and with the portion of the sheet of material having the closure bonding material disposed thereon bondingly connected to an adjacent portion of the sheet of material for cooperating to secure the sheet of material about the floral grouping to provide a wrapper having an upper end and a lower end, the first end of the flap being connected to a portion of the wrapper near the lower end thereof and the flap being folded over the lower end of the wrapper and the second end of the flap being connected to another portion of the wrapper near the lower end thereof whereby the flap extends over the lower end of the wrapper.

30. A plant package, comprising:

a sheet of material having an upper surface and a lower surface;

a flap initially comprising a separate piece of material and having a first end and a second end; and a floral grouping having a stem end and a bloom end, the sheet of material being wrapped about the floral grouping to provide a wrapper with an upper end and a lower end and being wrapped one or more times about the floral grouping and with the first end of the flap being bondingly connected to a portion of the wrapper near the lower end thereof and the flap being folded over the lower end of the wrapper and the second end of the flap being bondingly connected to another portion of the wrapper near the lower end thereof whereby the flap extends over the lower end of the wrapper.

* * * * *